(12) United States Patent
Kishida et al.

(10) Patent No.: US 10,940,730 B2
(45) Date of Patent: *Mar. 9, 2021

(54) EXTENSION-RETRACTION LINK AND SUSPENSION

(71) Applicant: NSK LTD., Tokyo (JP)

(72) Inventors: Hirotaka Kishida, Kanagawa (JP); Yasuyuki Matsuda, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/493,579

(22) PCT Filed: Oct. 12, 2018

(86) PCT No.: PCT/JP2018/038137
§ 371 (c)(1),
(2) Date: Sep. 12, 2019

(87) PCT Pub. No.: WO2019/078119
PCT Pub. Date: Apr. 25, 2019

(65) Prior Publication Data
US 2020/0238776 A1     Jul. 30, 2020

(30) Foreign Application Priority Data
Oct. 19, 2017   (JP) .............................. JP2017-202529

(51) Int. Cl.
*B60G 7/00*   (2006.01)
*B60G 17/015*   (2006.01)
*B60G 7/02*   (2006.01)

(52) U.S. Cl.
CPC ............. *B60G 7/003* (2013.01); *B60G 7/008* (2013.01); *B60G 7/02* (2013.01); *B60G 17/015* (2013.01)

(58) Field of Classification Search
CPC . B60G 3/18; B60G 7/00; B60G 7/003; B60G 7/006; B60G 7/008; B60G 7/02; B60G 17/00; B60G 17/015; B60G 17/016
See application file for complete search history.

(56) References Cited

U.S. PATENT DOCUMENTS 2,642,752 A   6/1953 Geyer et al.
2,676,045 A   4/1954 Moskovitz et al.
(Continued)

FOREIGN PATENT DOCUMENTS

JP   55-44153 A   3/1980
JP   55-86116 U   6/1980
(Continued)

OTHER PUBLICATIONS

Communication dated Mar. 12, 2019 in Japanese Application No. 2019-507873.

(Continued)

*Primary Examiner* — Barry Gooden, Jr.
(74) *Attorney, Agent, or Firm* — Sughrue Mion, PLLC

(57) ABSTRACT

An extension-retraction link includes: a stationary shaft having a tubular shape; a first universal joint that connects the stationary shaft to a vehicle body side member; a movable shaft that can slide with respect to the stationary shaft; a second universal joint that connects the movable shaft to a hub carrier; and an actuator that moves the movable shaft. The movable shaft includes: a first plane surface; a second plane surface making an angle with respect to the first plane surface; a third plane surface opposite the first plane surface; and a fourth plane surface opposite the second plane surface. The stationary shaft includes: first to fourth bushes in contact with the first to fourth plane surfaces, respectively; a first elastic member pressing the (Continued)

third bush to the third plane surface; and a second elastic member pressing the fourth bush to the fourth plane surface.

5 Claims, 14 Drawing Sheets

(56) References Cited

U.S. PATENT DOCUMENTS

| | | | |
|---|---|---|---|
| 2,707,645 | A | 5/1955 | Moskovitz et al. |
| 2,841,428 | A | 7/1958 | Moskovitz et al. |
| 2,885,248 | A | 5/1959 | White |
| 3,130,992 | A | 4/1964 | Peras |
| 4,347,014 | A | 8/1982 | Smith |
| 4,431,328 | A | 2/1984 | Smith |
| 4,986,688 | A | 1/1991 | Tuan et al. |
| 5,099,161 | A * | 3/1992 | Wolfbauer, III ........ F16H 25/20 310/80 |
| 5,141,069 | A | 8/1992 | Yasui |
| 5,809,833 | A * | 9/1998 | Newport ................ F16H 25/20 192/141 |
| 6,267,387 | B1 * | 7/2001 | Weiss ...................... B60G 3/26 280/124.106 |
| 6,293,561 | B1 * | 9/2001 | Goetzen .................. B60G 3/01 280/5.5 |
| 7,429,216 | B2 | 9/2008 | Sekine |
| 7,537,223 | B2 | 5/2009 | Zetterstroem |
| 7,562,594 | B2 | 7/2009 | Nagai et al. |
| 7,878,511 | B2 | 2/2011 | Haeusler et al. |
| 8,960,690 | B2 | 2/2015 | Hinohara et al. |
| 9,174,504 | B1 * | 11/2015 | Powell ................... B60G 7/003 |
| 2002/0029610 | A1 * | 3/2002 | Chrystall ............. A43D 999/00 73/7 |
| 2002/0113396 | A1 | 8/2002 | Lee |
| 2003/0068193 | A1 | 4/2003 | El-Haw et al. |
| 2003/0111812 | A1 * | 6/2003 | Carlstedt .............. B60T 8/3285 280/124.16 |
| 2005/0160846 | A1 * | 7/2005 | Chiang .................. F16H 25/20 74/89.35 |
| 2006/0081078 | A1 | 4/2006 | Nagai et al. |
| 2006/0159375 | A1 | 7/2006 | Krishnan et al. |
| 2007/0131474 | A1 * | 6/2007 | Zetterstroem .......... B60G 3/265 180/411 |
| 2007/0154254 | A1 | 7/2007 | Bevirt |
| 2007/0286750 | A1 * | 12/2007 | Beck ....................... F04B 47/04 417/415 |
| 2008/0085151 | A1 | 4/2008 | Pazdirek |
| 2008/0157497 | A1 * | 7/2008 | Terada .................... B62D 7/146 280/124.1 |
| 2008/0190682 | A1 * | 8/2008 | Mahy ................... B60B 35/1072 180/209 |
| 2008/0257081 | A1 | 10/2008 | Hakui et al. |
| 2009/0281691 | A1 * | 11/2009 | Sakakibara ............ B60G 7/006 701/37 |
| 2010/0019465 | A1 | 1/2010 | Yuta et al. |
| 2010/0023213 | A1 * | 1/2010 | Mizuno .................. B62D 17/00 701/37 |
| 2010/0289658 | A1 | 11/2010 | Brown |
| 2011/0101637 | A1 | 5/2011 | Shibuya |
| 2011/0107859 | A1 | 5/2011 | Osterlanger et al. |
| 2012/0104716 | A1 * | 5/2012 | Hintzen ................. B62D 17/00 280/124.135 |
| 2013/0190980 | A1 * | 7/2013 | Ramirez Ruiz ........ B60G 7/003 701/38 |
| 2013/0334919 | A1 * | 12/2013 | Welp ........................ H02K 7/06 310/80 |
| 2014/0338480 | A1 * | 11/2014 | Wu ........................ F16H 25/20 74/89.23 |
| 2015/0102571 | A1 * | 4/2015 | Slawson .................. B62D 5/14 280/6.157 |
| 2015/0102593 | A1 * | 4/2015 | Slawson .................. B60G 3/01 280/830 |
| 2015/0377329 | A1 * | 12/2015 | Wu ........................ F16H 25/20 74/89.38 |
| 2016/0047446 | A1 * | 2/2016 | Hung ..................... F16H 25/20 74/89.35 |
| 2017/0114535 | A1 | 4/2017 | Benthien et al. |
| 2017/0137066 | A1 | 5/2017 | Ayuzawa et al. |
| 2018/0022346 | A1 | 1/2018 | Murakami |
| 2019/0155124 | A1 | 5/2019 | Park |
| 2019/0275852 | A1 * | 9/2019 | Everline ................ B60G 7/008 |
| 2019/0381847 | A1 * | 12/2019 | Kumagai ............... B60G 7/008 |
| 2020/0070891 | A1 * | 3/2020 | Gunji ...................... B60G 3/18 |
| 2020/0148264 | A1 * | 5/2020 | Daikoku .............. B60G 17/015 |

FOREIGN PATENT DOCUMENTS

| | | |
|---|---|---|
| JP | 56-101216 U | 8/1981 |
| JP | 56-101218 U | 8/1981 |
| JP | 1-112138 U | 7/1989 |
| JP | 4-228370 A | 8/1992 |
| JP | 06-286447 A | 10/1994 |
| JP | 6-286447 A | 10/1994 |
| JP | 2004-122932 A | 4/2004 |
| JP | 2005-145122 A | 6/2005 |
| JP | 2005-289288 A | 10/2005 |
| JP | 2006-064162 A | 3/2006 |
| JP | 2006-64162 A | 3/2006 |
| JP | 2006-218959 A | 8/2006 |
| JP | 2007-210497 A | 8/2007 |
| JP | 3137802 U | 12/2007 |
| JP | 2009-133339 A | 6/2009 |
| JP | 2010-052583 A | 3/2010 |
| JP | 2010-510926 A | 4/2010 |
| JP | 2010-179691 A | 8/2010 |
| JP | 2014-012473 A | 1/2014 |
| JP | 2014-190436 A | 10/2014 |
| JP | 2014-234078 A | 12/2014 |
| JP | 2015-155255 A | 8/2015 |
| JP | 5955254 B2 | 7/2016 |
| WO | 2009/141265 A1 | 11/2009 |
| WO | 2010/140237 A1 | 12/2010 |
| WO | 2016/125586 A1 | 8/2016 |
| WO | 2019/077972 A1 | 4/2019 |
| WO | 2019/078118 A1 | 4/2019 |
| WO | 2019/078119 A1 | 4/2019 |
| WO | 2019/078120 A1 | 4/2019 |
| WO | 2019/078121 A1 | 4/2019 |
| WO | 2019/111534 A1 | 6/2019 |

OTHER PUBLICATIONS

International Search Report dated Nov. 27, 2018 in International Application No. PCT/JP2018/038135.
International Search Report dated Jan. 15, 2019 in International Application No. PCT/JP2018/038136.
Written Opinion of the International Searching Authority dated Jan. 15, 2019 in International Application No. PCT/JP2018/038136.
International Search Report dated Nov. 13, 2018 in International Application No. PCT/JP2018/036255.
International Search Report for PCT/JP2018/038137 dated Dec. 4, 2018 (PCT/ISA/210).
Communication dated Aug. 18, 2020, from the United States Patent and Trademark office in U.S. Appl. No. 16/609,070.
English Translation of Japanese Publication 2004-122932, which published on Apr. 22, 2004.

* cited by examiner

EXTENSION-RETRACTION LINK AND SUSPENSION

CROSS-REFERENCE TO RELATED APPLICATION

This application is a National Stage of PCT international application Ser. No. PCT/JP2018/038137 filed on Oct. 12, 2018, which designates the United States, incorporated herein by reference, and which is based upon and claims the benefit of priority from Japanese Patent Application No. 2017-202529 filed on Oct. 19, 2017, the entire contents of which are incorporated herein by reference.

BACKGROUND

1. Technical Field

The present invention relates to an extension-retraction link and a suspension.

2. Description of the Related Art

A vehicle has a suspension provided between its body and a wheel. The suspension is a device that makes vibrations due to fluctuation of a road surface less likely to be transmitted to the vehicle body, and that positions the wheel. A multi-link suspension is known as one of suspension types. Prior Art 1, for example, describes an example of the multi-link suspension.

PRIOR ART

Prior Art 1: Japanese Laid-open Patent Publication No. 2015-155255

In some cases, a relative posture of the wheel with respect to the vehicle body is required to be changed in accordance with motion performance required for the vehicle.

The present disclosure has been made in view of the above, and aims to provide an extension-retraction link that can easily change a relative posture of the wheel with respect to the vehicle body.

SUMMARY

To achieve the purpose described above, an extension-retraction link according to an aspect of the present disclosure includes: a stationary shaft having a tubular shape; a first universal joint that connects the stationary shaft to a vehicle body side member such that the stationary shaft is capable of rotating and swinging with respect to the vehicle body side member; a movable shaft, part of which is located inside the stationary shaft, and that is capable of sliding with respect to the stationary shaft; a second universal joint that connects the movable shaft to a hub carrier such that the movable shaft is capable of rotating and swinging with respect to the hub carrier; and an actuator that includes: a motor attached to the stationary shaft; a screw shaft rotated by the motor; and a nut that engages with the screw shaft and is fixed to the movable shaft. The movable shaft includes: a first plane surface; a second plane surface making an angle with respect to the first plane surface; a third plane surface located on the opposite side of the first plane surface; and a fourth plane surface located on the opposite side of the second plane surface. The stationary shaft includes: a first bush in contact with the first plane surface; a second bush in contact with the second plane surface; a third bush in contact with the third plane surface; a fourth bush in contact with the fourth plane surface; a first elastic member pressing the third bush to the third plane surface; and a second elastic member pressing the fourth bush to the fourth plane surface.

Accordingly, the extension-retraction link can change the posture of the wheel by moving the movable shaft. The extension-retraction link can easily change the relative posture of the wheel with respect to the vehicle body.

Further, the first elastic member and the second elastic member maintain the state where the first bush, the second bush, the third bush, and the fourth bush are in contact with the movable shaft. This can prevent backlash of the movable shaft without high machining accuracy. The extension-retraction link can make the movement of the movable shaft smooth.

As a preferred aspect of the extension-retraction link, a connected portion of the first universal joint and the vehicle body side member and a connected portion of the second universal joint and the hub carrier are located on an identical side with respect to a plane including a rotation axis of the screw shaft, and are located on the opposite side of the third bush and the fourth bush.

The positional relation among the stationary shaft, the first universal joint, the movable shaft, and the second universal joint causes force toward the first bush and the second bush to act on the movable shaft with the movement of the movable shaft. Even in such a case, a gap becomes harder to be formed in the gap between the third bush and the third plane surface and the gap between the fourth bush and the fourth plane surface. Accordingly, the extension-retraction link can prevent backlash of the movable shaft even when force in the radius direction is applied to the movable shaft.

As a preferred aspect of the extension-retraction link, the angle made between the first plane surface and the second plane surface and the angle made between the third plane surface and the fourth plane surface are acute angles.

Accordingly, stiffness of the movable shaft with respect to a moment applied to the movable shaft increases. This prevents deformation of the movable shaft, and makes the movement of the movable shaft smoother.

As a preferred aspect of the extension-retraction link, each of the first bush, the second bush, the third bush, and the fourth bush includes a plurality of lubricant grooves, in which lubricant is filled.

This makes it harder for lubricant surrounding the movable shaft to be exhausted, thereby making the movement of the movable shaft smoother.

A suspension according to another aspect of the present disclosure includes the extension-retraction link.

The extension-retraction link of the suspension can easily change the relative posture of the wheel with respect to the vehicle body. Further, the suspension makes the movement of the wheel smooth by the movable shaft, backlash of which is prevented.

The present disclosure can provide the extension-retraction link that can easily change the relative posture of the wheel with respect to the vehicle body.

DETAILED DESCRIPTION

The following describes the present invention in detail with reference to the accompanying drawings. The following embodiment for carrying out the invention (hereinafter described as the embodiment) does not limit the invention. The constituent elements in the embodiment described below include elements that can be easily conceived of by a person skilled in the art, elements substantially equivalent thereto, and elements within a so-called range of equivalents. The constituent elements disclosed in the following embodiment can be combined as appropriate.

Figure 1:
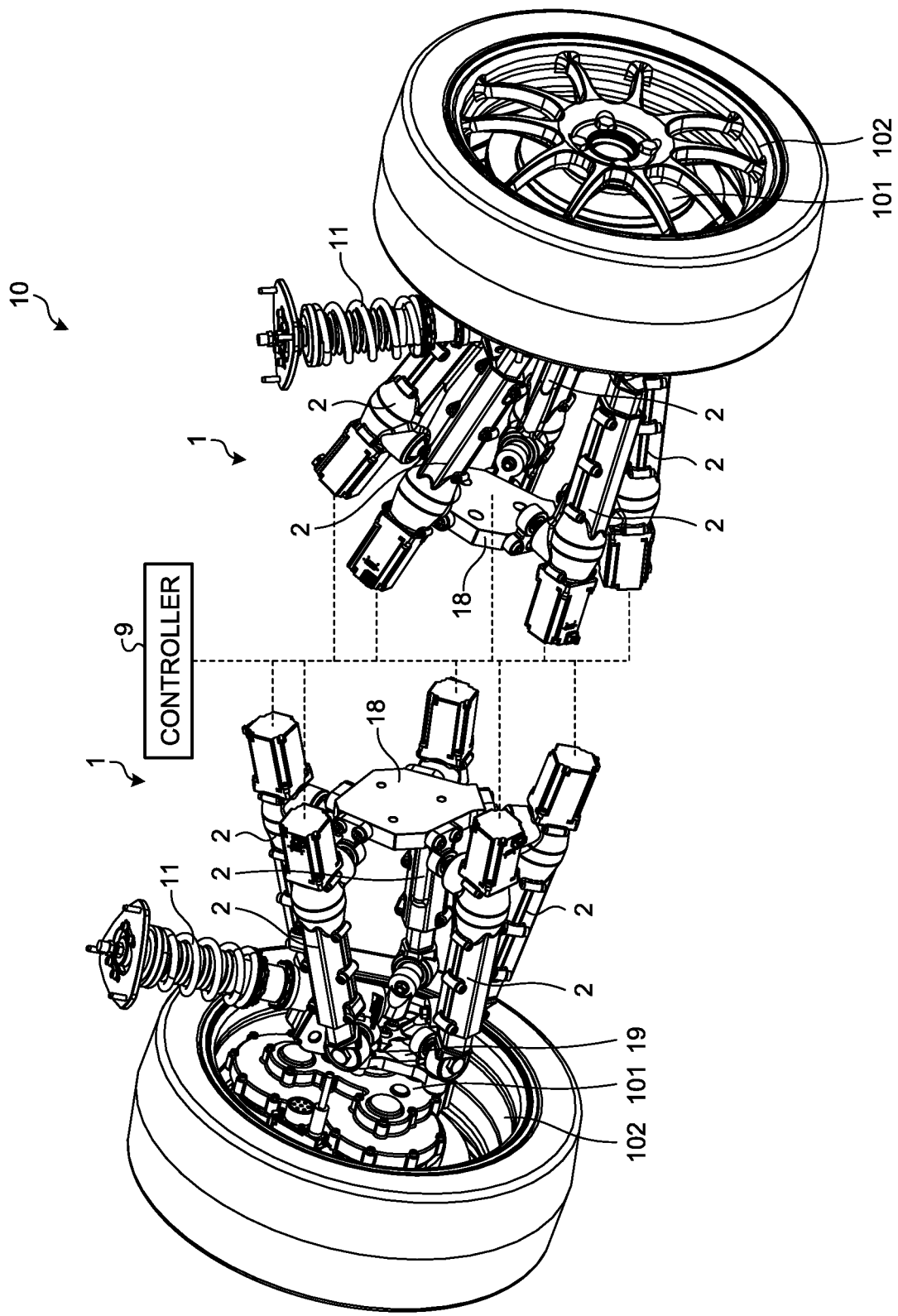
FIG. 1 is a perspective view of a suspension in an embodiment.

FIG. 1 is a perspective view of a suspension in the embodiment. A vehicle 10 in the embodiment includes wheels 102, hub units 101, vehicle body side members 18, hub carriers 19, suspensions 1, and a controller 9. For example, the vehicle 10 includes four wheels 102, each of which includes the hub unit 101. The hub unit 101 includes a hub bearing, two motors, and a speed changer, for example. The hub unit 101 rotatably supports the wheel 102 and drives the wheel 102. The vehicle body side member 18 is fixed to the vehicle body. The hub carrier 19 is a member fixed to the hub unit 101. The hub carrier 19 is also called a knuckle.

The suspension 1 is a device that connects the vehicle body (chassis) of the vehicle 10 and the hub unit 101. The suspension 1 is a multi-link suspension. As illustrated in FIG. 1, the suspension 1 includes a shock absorber 11 and five extension-retraction links 2 for each wheel 102.

The shock absorber 11 is a device that reduces shock transmitted to the vehicle body from a road surface during vehicle running. One end of the shock absorber 11 is fixed to the vehicle body. The other end of the shock absorber 11 is fixed to the hub carrier 19. The shock absorber 11 can extend and retract in an upper-lower direction.

Figure 2:
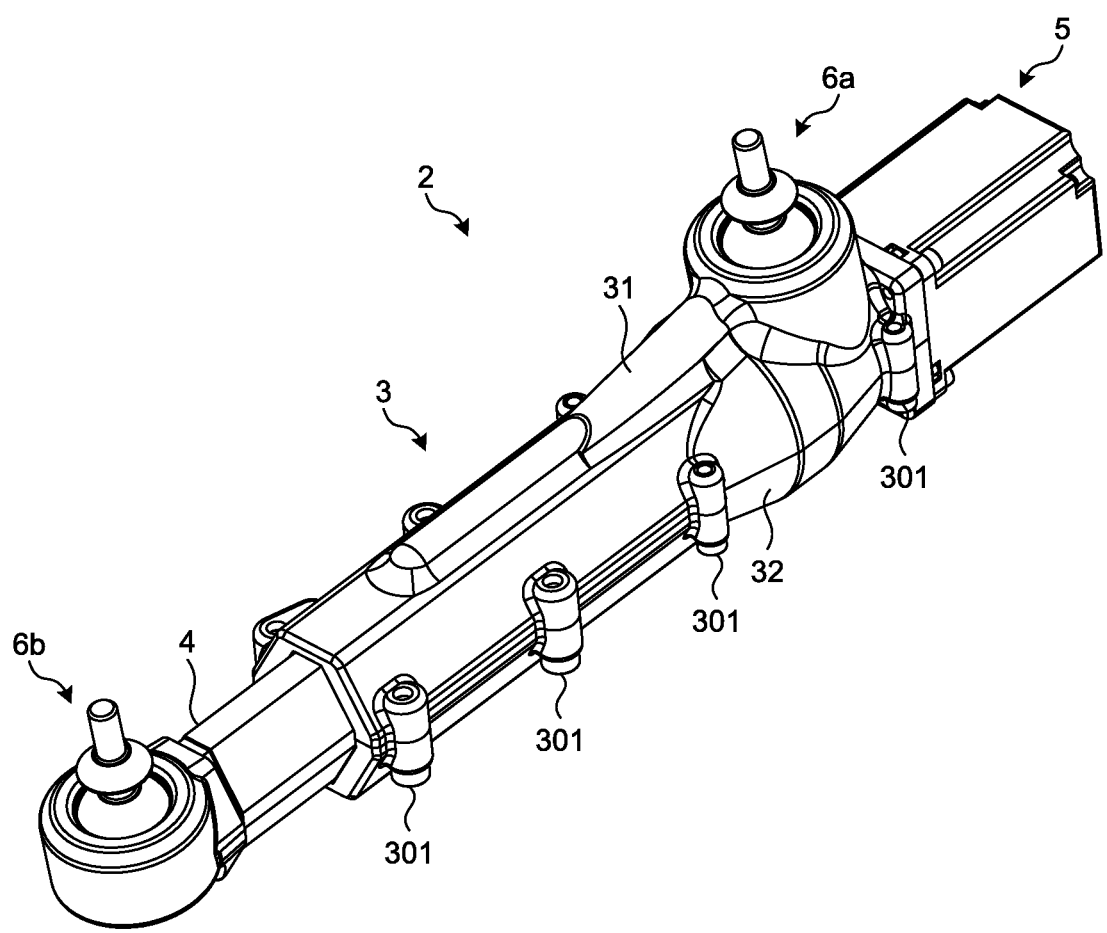
FIG. 2 is a perspective view of an extension-retraction link in the embodiment.
Figure 3:
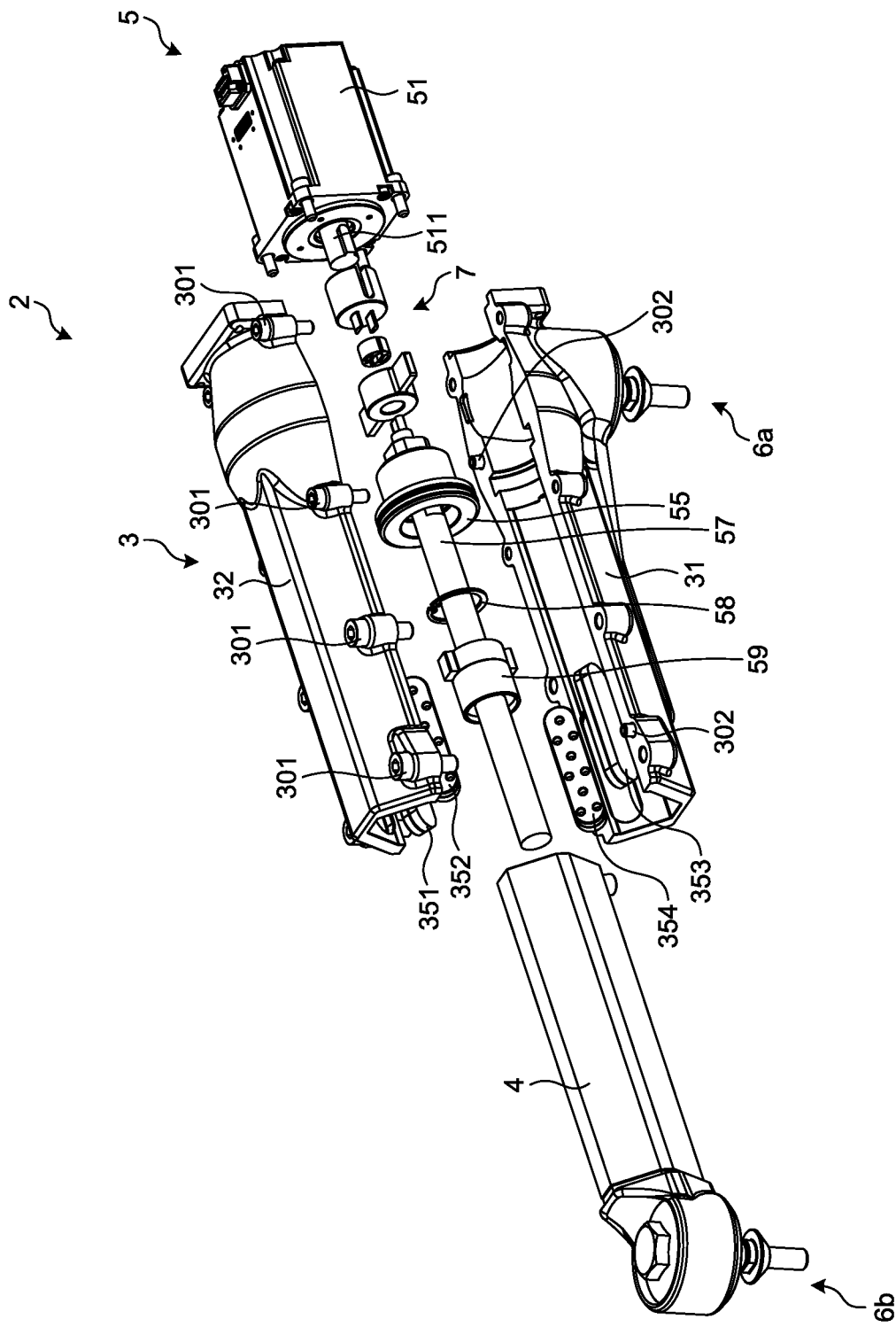
FIG. 3 is an exploded perspective view of the extension-retraction link in the embodiment.
Figure 4:
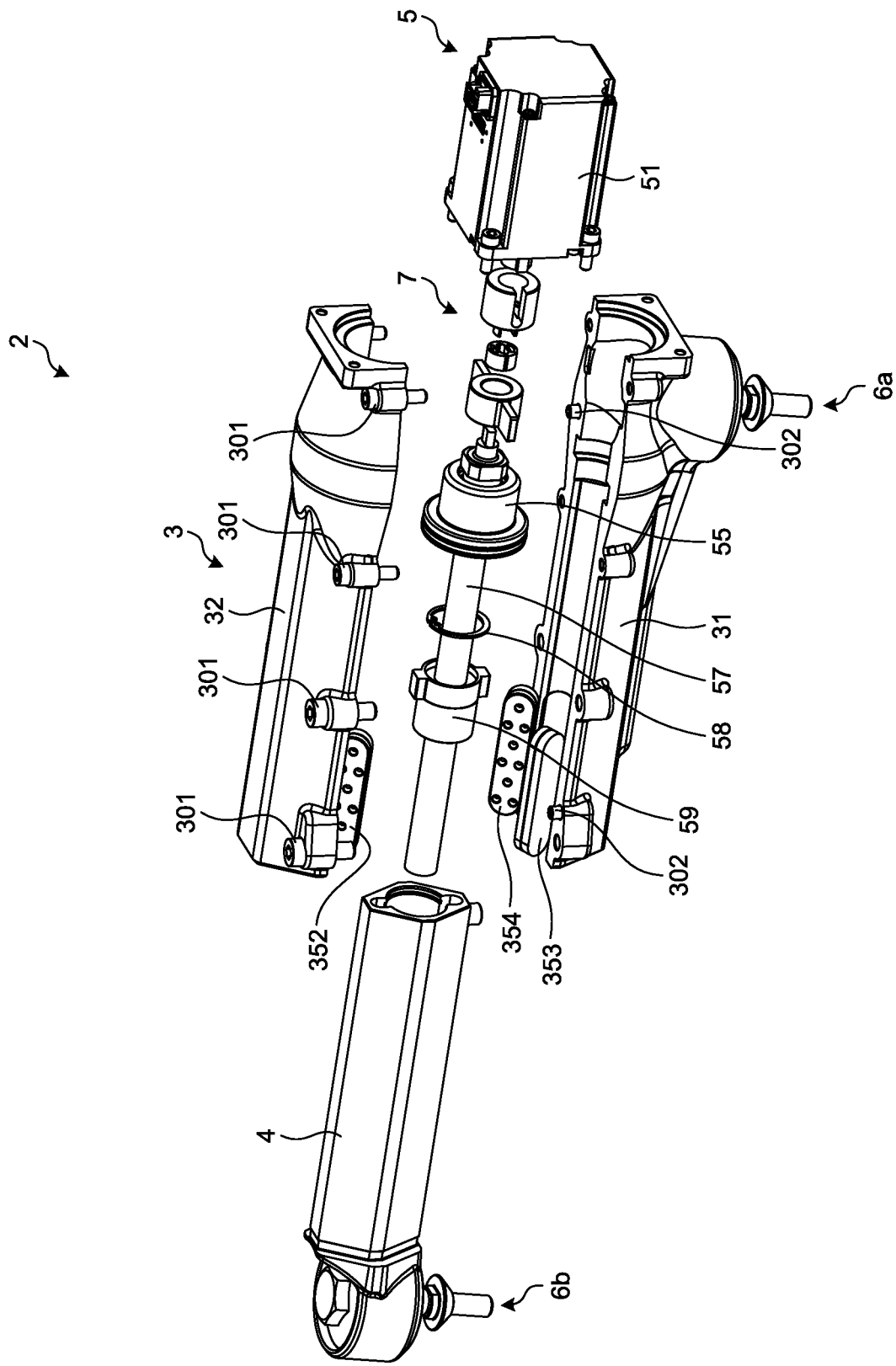
FIG. 4 is another exploded perspective view of the extension-retraction link in the embodiment.
Figure 5:
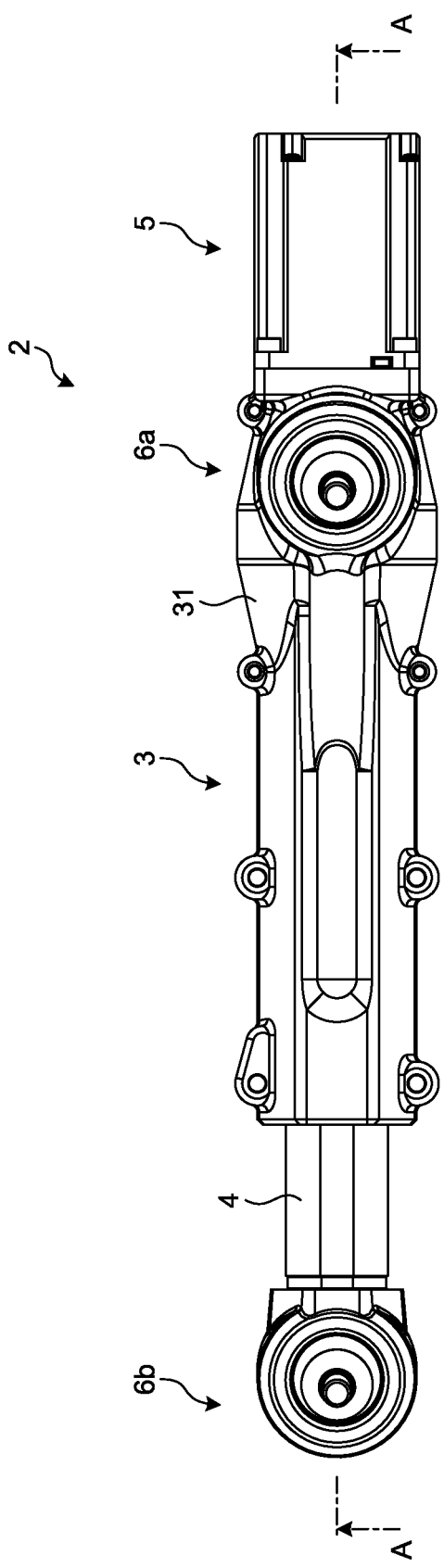
FIG. 5 is a plan view of the extension-retraction link in the embodiment.
Figure 6:
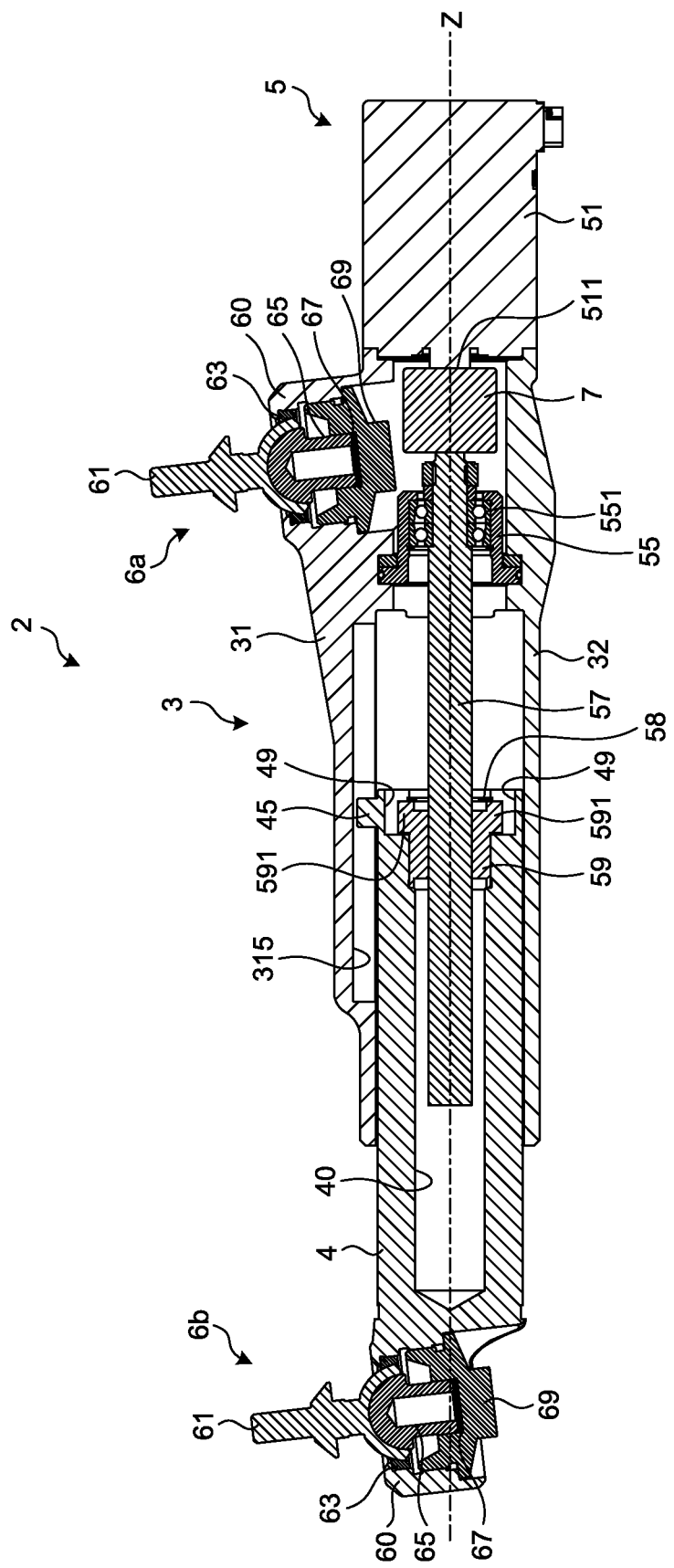
FIG. 6 is a cross-sectional view taken along A-A in FIG. 5.

FIG. 2 is a perspective view of an extension-retraction link of the embodiment. FIG. 3 is an exploded perspective view of the extension-retraction link of the embodiment. FIG. 4 is another exploded perspective view of the extension-retraction link of the embodiment. FIG. 5 is a plan view of the extension-retraction link of the embodiment. FIG. 6 is a cross sectional view taken along A-A in FIG. 5.

The extension-retraction link 2 is a member that connects the vehicle body side member 18 and the hub carrier 19. As illustrated in FIG. 1, two extension-retraction links 2 are arranged on an upper side of the rotation axis of the wheel 102. Three extension-retraction links 2 are arranged on a lower side of the rotation axis of the wheel 102. As illustrated in FIG. 2, the extension-retraction link 2 includes a stationary shaft 3, a movable shaft 4, a first universal joint 6a, a second universal joint 6b, and an actuator 5.

The stationary shaft 3 is connected to the vehicle body side member 18 (refer to FIG. 1) with the first universal joint 6a interposed therebetween. The stationary shaft 3 has a tubular shape. As illustrated in FIGS. 3 and 4, the stationary shaft 3 includes a first member 31 and a second member 32. The first member 31 and the second member 32 are connected to each other with fastener members 301. When the first member 31 and the second member 32 are assembled, two positioning pins 302 are used. The first universal joint 6a is attached to the first member 31.

The movable shaft 4 is connected to the hub carrier 19 (refer to FIG. 1) with the second universal joint 6b interposed therebetween. As illustrated in FIG. 6, the movable shaft 4 is a hollow member having an internal space 40. Part of the movable shaft 4 is located inside the stationary shaft 3. The movable shaft 4 can slide with respect to the stationary shaft 3. The slidable length of the movable shaft 4 is limited by a stopper 45 (refer to FIG. 6) provided to the movable shaft 4. The stopper 45 is disposed in a groove 315 provided on an inner circumferential surface of the first member 31. When the stopper 45 reaches the end of the groove 315, the stopper 45 is in contact with the first member 31, thereby stopping the movable shaft 4. This prevents the movable shaft 4 from dropping off from the stationary shaft 3.

Figure 7:
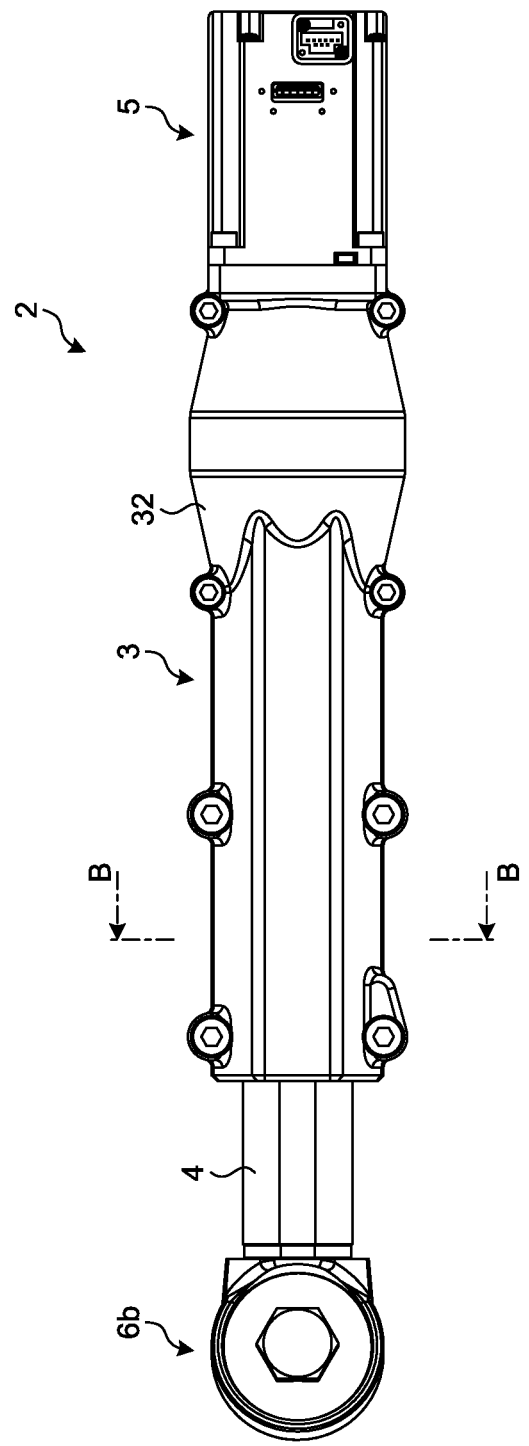
FIG. 7 is a bottom view of the extension-retraction link in the embodiment.
Figure 8:
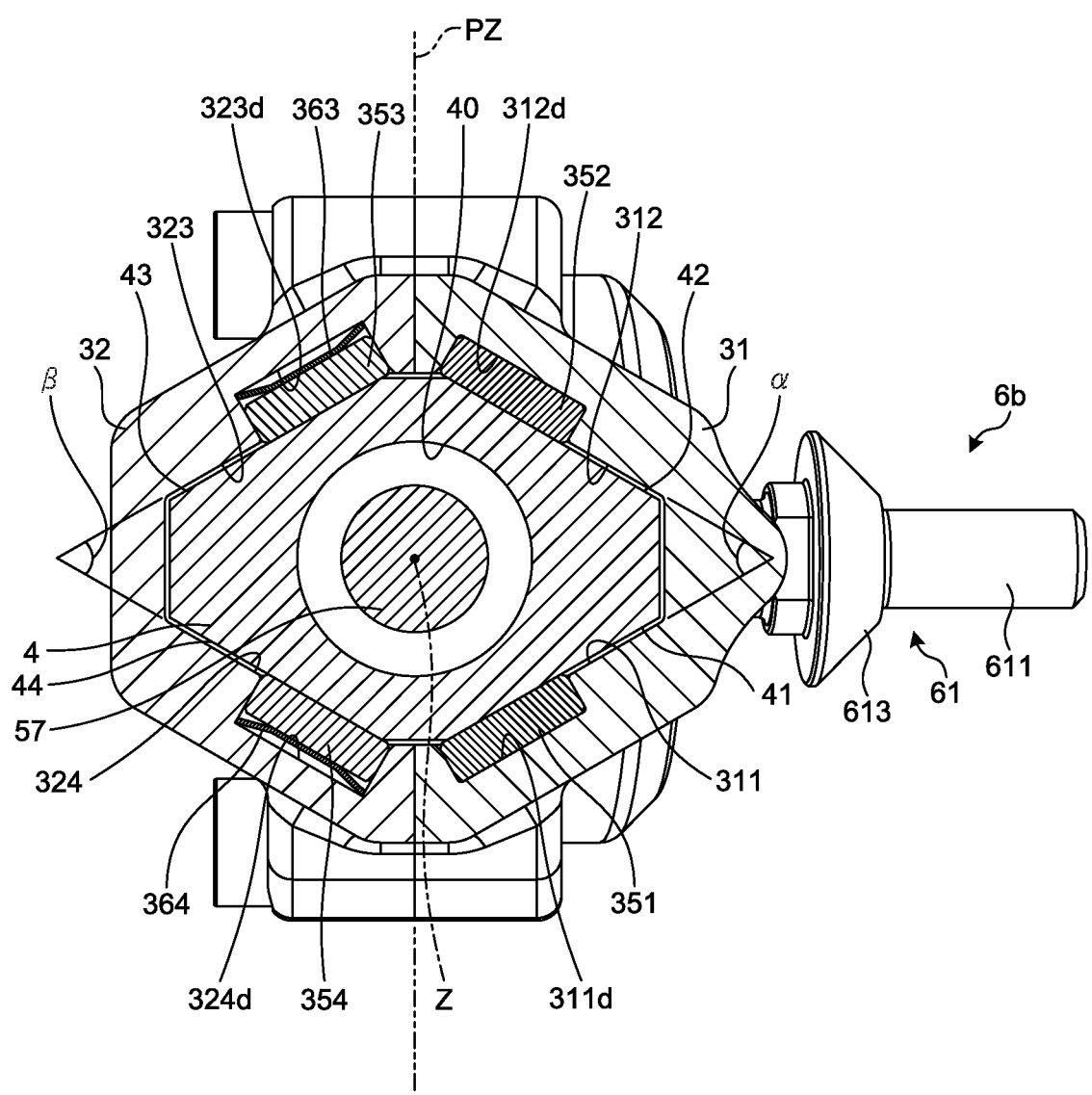
FIG. 8 is a cross-sectional view taken along B-B in FIG. 7.
Figure 9:
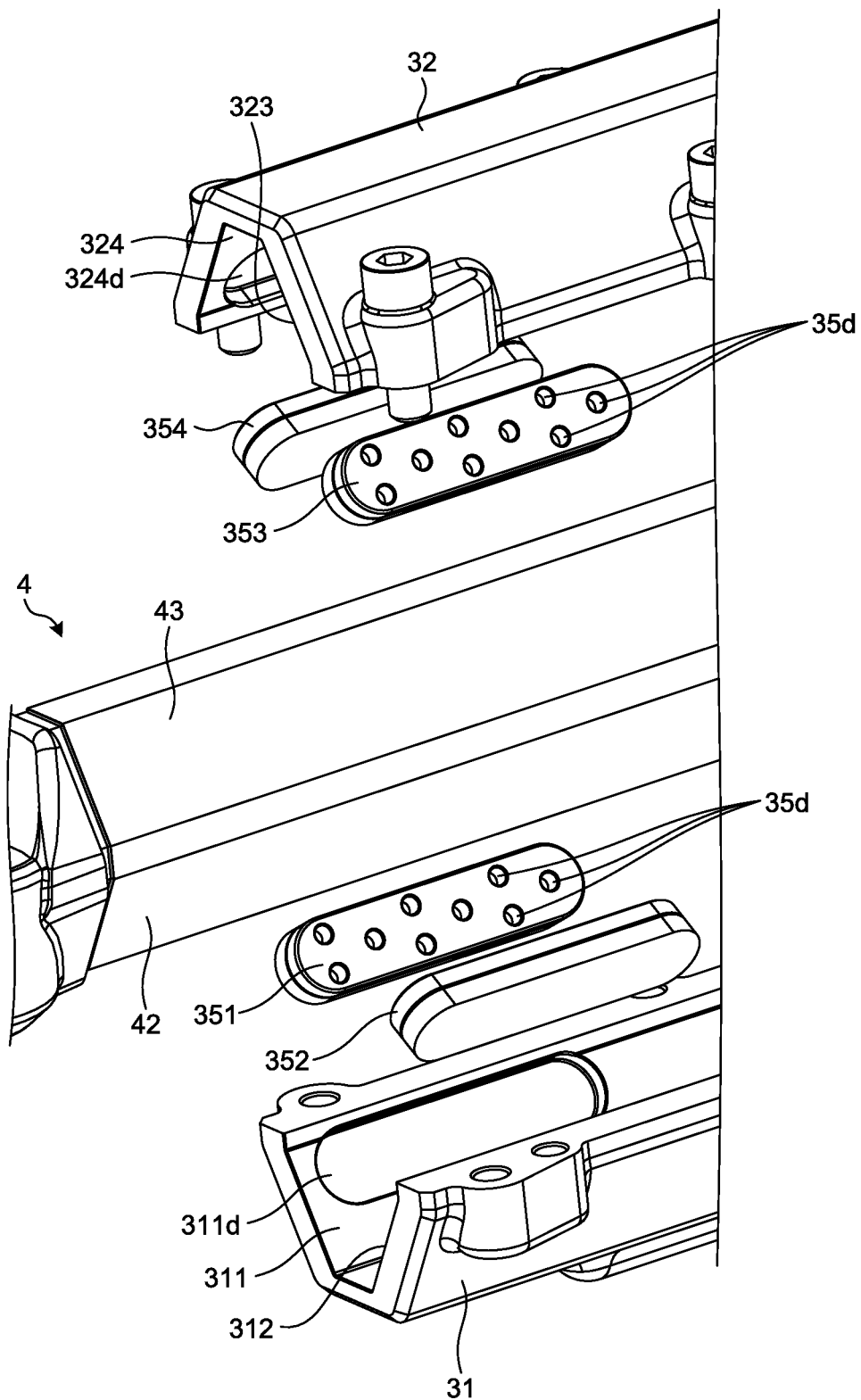
FIG. 9 is an exploded perspective view of a stationary shaft in the embodiment.

FIG. 7 is a bottom view of the extension-retraction link in the embodiment. FIG. 8 is a cross-sectional view taken along B-B in FIG. 7. FIG. 9 is an exploded perspective view of the stationary shaft in the embodiment.

As illustrated in FIG. 8, the movable shaft 4 includes, as surfaces facing the stationary shaft 3, a first plane surface 41, a second plane surface 42, a third plane surface 43, and a fourth plane surface 44. The first plane surface 41 and the second plane surface 42 face the first member 31. The second plane surface 42 makes an angle with respect to the first plane surface 41. An angle α made between the first plane surface 41 and the second plane surface 42 is an acute angle. The third plane surface 43 and the fourth plane surface 44 face the second member 32. The fourth plane surface 44 makes an angle with respect to the third plane surface 43. An angle β made between the third plane surface 43 and the fourth plane surface 44 is an acute angle. For example, the third plane surface 43 is in parallel with the first plane surface 41, and the fourth plane surface 44 is in parallel with the second plane surface 42. Accordingly, the angle β is equal to the angle α. As illustrated in FIG. 8, the cross-sectional surface of the movable shaft 4, which is obtained by cutting the movable shaft 4 with a plane perpendicular to a rotation axis Z, has an octagonal shape having four pairs of parallel sides.

The rotation axis Z is the rotation axis of a screw shaft 57, which is described later. That is, the rotation axis Z is a straight line passing through the gravity center of each cross-sectional surface when the screw shaft 57 is cut with a plane perpendicular to the extending direction of the screw shaft 57. In the following description, the direction parallel with the rotation axis Z is described as an axial direction. The direction perpendicular to the rotation axis Z is described as a radius direction.

As illustrated in FIG. 8, the first member 31 includes a first facing surface 311, a second facing surface 312, a first bush 351, and a second bush 352. The first facing surface 311 faces the first plane surface 41 of the movable shaft 4. The second facing surface 312 faces the second plane surface 42 of the movable shaft 4. For example, the first facing surface 311 is in parallel with the first plane surface 41, while the second facing surface 312 is in parallel with the second plane surface 42. The first bush 351, which is formed in a plate shape, is fitted in a recess 311d provided on the first facing surface 311. The thickness of the first bush 351 is larger than the depth of the recess 311d. The first bush 351 is in contact with the first plane surface 41. The second bush 352, which is formed in a plate shape, is fitted in a recess 312d provided on the second facing surface 312. The thickness of the second bush 352 is larger than the depth of the recess 312d. The second bush 352 is in contact with the second plane surface 42.

As illustrated in FIG. 8, the second member 32 includes a third facing surface 323, a fourth facing surface 324, a third bush 353, a fourth bush 354, a first elastic member 363, and a second elastic member 364. The third facing surface 323 faces the third plane surface 43 of the movable shaft 4. The fourth facing surface 324 faces the fourth plane surface 44 of the movable shaft 4. For example, the third facing surface 323 is in parallel with the third plane surface 43, while the fourth facing surface 324 is in parallel with the fourth plane surface 44. The third bush 353, which is formed in a plate shape, is fitted in a recess 323d provided on the third facing surface 323. The third bush 353 is in contact with the third plane surface 43. The first elastic member 363 is a disc spring, for example. The first elastic member 363 is disposed between the bottom surface of the recess 323d and the third bush 353. The first elastic member 363 presses the third bush 353 to the third plane surface 43. The fourth bush 354, which is formed in a plate shape, is fitted in a recess 324d provided on the fourth facing surface 324. The fourth bush 354 is in contact with the fourth plane surface 44. The second elastic member 364 is a disc spring, for example. The second elastic member 364 is disposed between the bottom surface of the recess 324d and the fourth bush 354. The second elastic member 364 presses the fourth bush 354 to the fourth plane surface 44.

As illustrated in FIGS. 6 and 8, the connected portion of the first universal joint 6a and the vehicle body side member 18, and the connected portion of the second universal joint 6b and the hub carrier 19 are located on the same side with respect to a plane including the rotation axis Z of the screw shaft 57, and are on the opposite side of the third bush 353 and the fourth bush 354. Each of the connected portion of the first universal joint 6a and the vehicle body side member 18, and the connected portion of the second universal joint 6b and the hub carrier 19 is a fastening portion 611, which is described later. The plane including the rotation axis Z of the screw shaft 57 is, for example, a plane PZ illustrated in FIG. 8.

As illustrated in FIG. 9, each of the first bush 351, the second bush 352, the third bush 353, and the fourth bush 354 includes a plurality of lubricant grooves 35d. The lubricant grooves 35d are filled with lubricant. The lubricant is grease, for example. The first bush 351 includes the lubricant grooves 35d that open on the first plane surface 41 side. The second bush 352 includes the lubricant grooves 35d that open on the second plane surface 42 side. The third bush 353 includes the lubricant grooves 35d that open on the recess 323d side. The fourth bush 354 includes the lubricant grooves 35d that open on the recess 324d side.

The angles $\alpha$ and $\beta$ illustrated in FIG. 8 are not necessarily acute angles. The third plane surface 43 may not be in parallel with the first plane surface 41. The fourth plane surface 44 may not be in parallel with the second plane surface 42.

Figure 10:
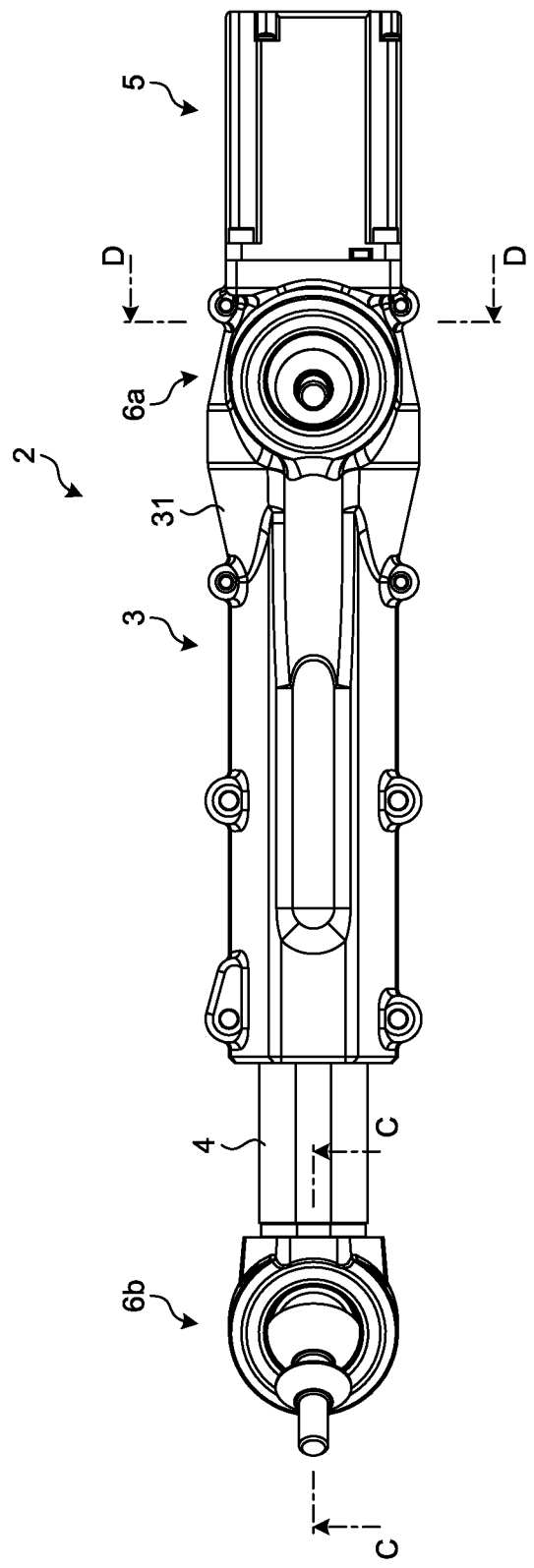
FIG. 10 is another plan view of the extension-retraction link in the embodiment.
Figure 11:
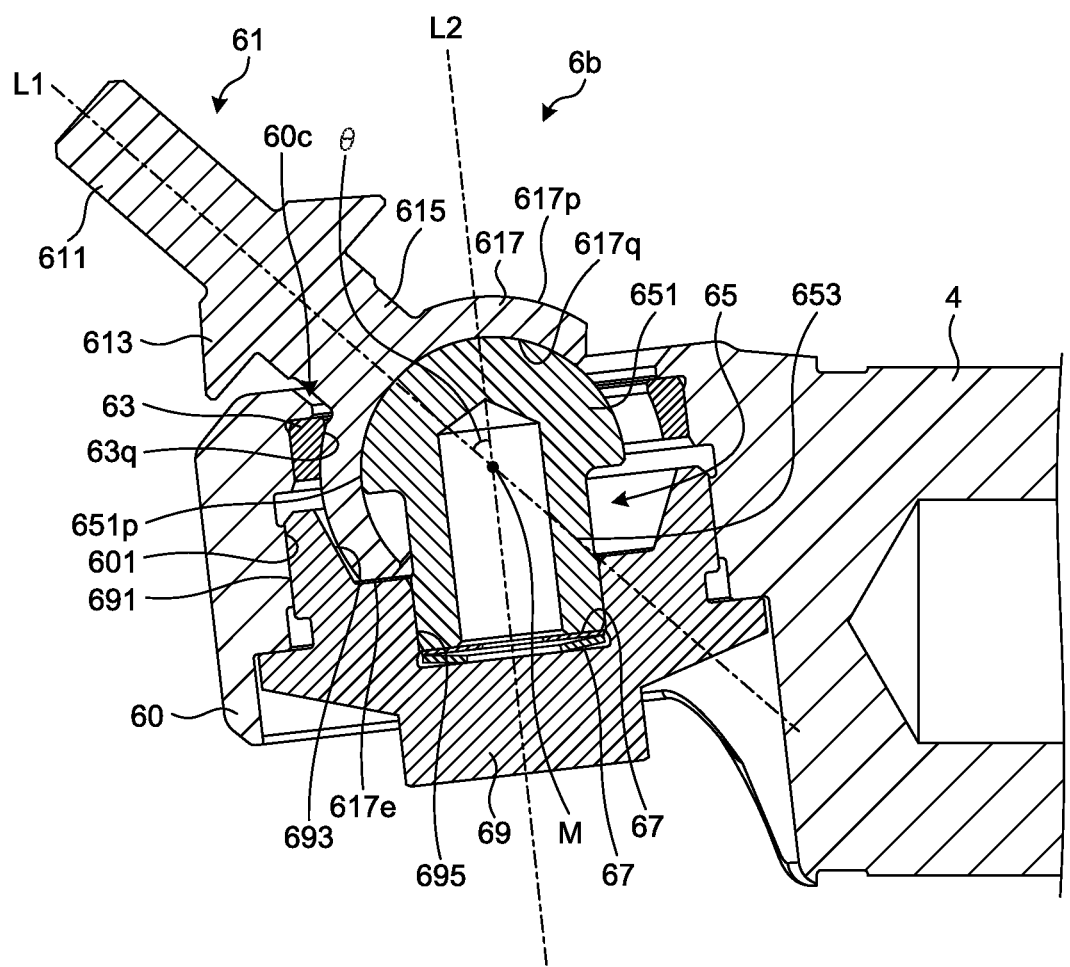
FIG. 11 is a cross-sectional view taken along C-C in FIG. 10.
Figure 12:
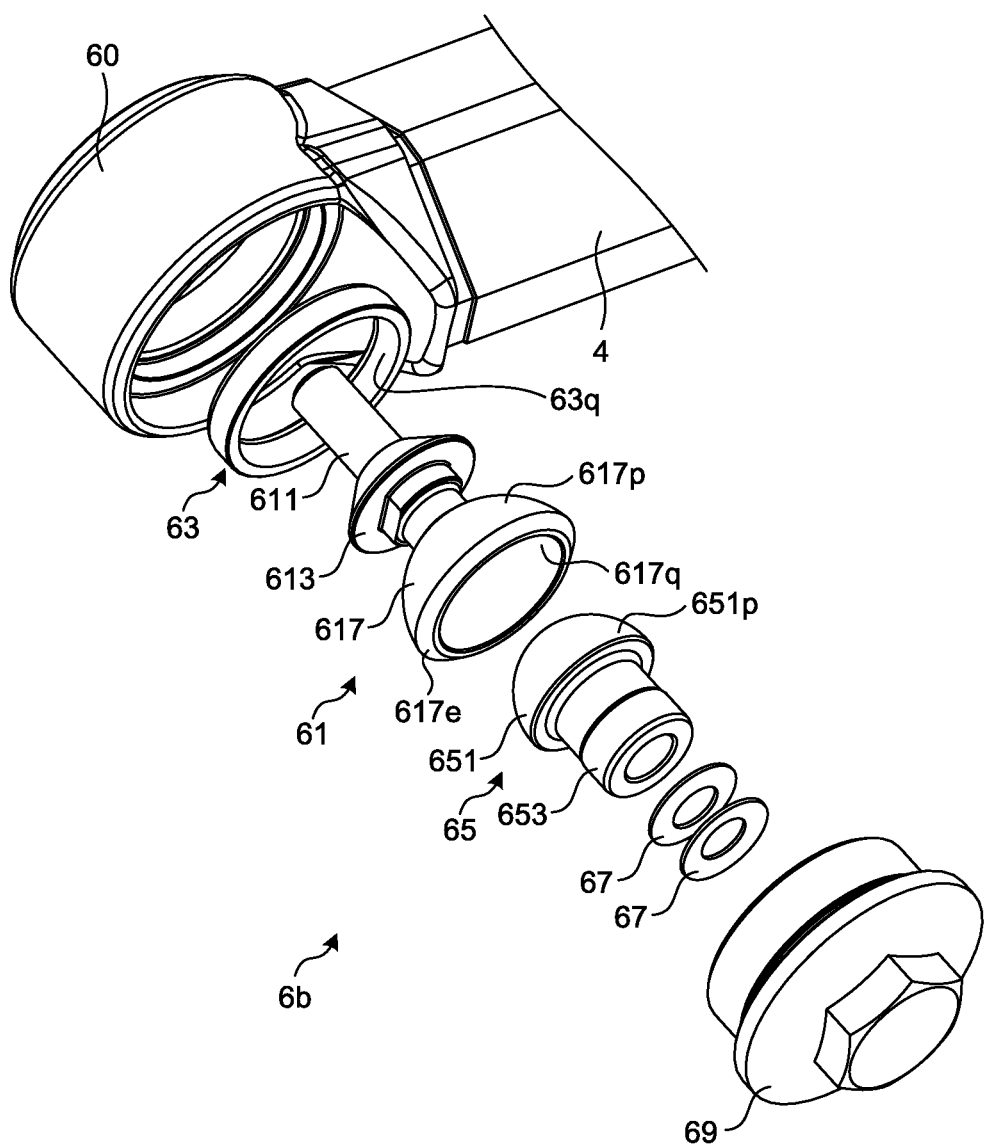
FIG. 12 is an exploded perspective view of a universal joint in the embodiment.

FIG. 10 is another plan view of the extension-retraction link of the embodiment. FIG. 11 is a cross-sectional view taken along C-C in FIG. 10. FIG. 12 is an exploded perspective view of the universal joint in the embodiment.

As illustrated in FIG. 10, the first universal joint 6a is attached to the first member 31 of the stationary shaft 3. The first universal joint 6a connects the stationary shaft 3 to the vehicle body side member 18 (refer to FIG. 1) such that the stationary shaft 3 can rotate and swing with respect to the vehicle body side member 18. The second universal joint 6b is attached to the movable shaft 4. The second universal joint 6b connects the movable shaft 4 to the hub carrier 19 (refer to FIG. 1) such that the movable shaft 4 can rotate and swing with respect to the hub carrier 19. In the description about the capability of rotation and swing, rotation means rotation around a straight line L1 (refer to FIG. 11) serving as the rotation center, while swing means movement by which an angle $\theta$ made between the straight line L1 and a straight line L2 changes. The straight line L1 is the straight line passing through the gravity center of each cross-sectional surface when an arm 61, which is described later, is cut with a plane perpendicular to the longitudinal direction of the arm 61. The straight line L2 is perpendicular to a circle formed by an outer shape of an external bush 63, which is described later, and passes through the center of the circle. An intersection M (refer to FIG. 11) of the straight lines L1 and L2 is the center of an arm convex surface 617p having a spherical surface shape, which is described later. In the embodiment, the first universal joint 6a and the second universal joint 6b have the same structure. In the following detailed description, the second universal joint 6b is described as an example. The description of the second universal joint 6b can also be applied to that of the first universal joint 6a.

As illustrated in FIGS. 11 and 12, the second universal joint 6b includes a housing 60, the arm 61, the external bush 63, an internal bush 65, elastic members 67, and a supporting member 69. The housing 60 is formed integrally with the end portion of the movable shaft 4. The housing 60 has a tubular shape. The housing 60 of the first universal joint 6a is formed integrally with the first member 31.

The arm 61 is the member connected to the hub carrier 19 (refer to FIG. 1). The arm 61 is made of metal. The metal used for the arm 61 is steel, for example. As illustrated in FIG. 11, part of the arm 61 is located inside the housing 60. As illustrated in FIGS. 11 and 12, the arm 61 includes the fastening portion 611, a flange portion 613, an intermediate portion 615, and a sliding portion 617. The fastening portion 611 and the flange portion 613 are located outside the housing 60. The fastening portion 611 is a columnar member having a thread on its outer circumferential surface. The flange portion 613 is a member that is located on the housing 60 side of the fastening portion 611 and has a substantially conical shape in which the diameter of the flange portion 613 increases toward the housing 60. The intermediate portion 615 is a member that extends on the housing 60 side from the flange portion 613 and has a substantially columnar shape. The intermediate portion 615 has two parallel flat surfaces on its outer circumferential surface. The sliding portion 617 is a member that is located on the housing 60 side of the intermediate portion 615 and has a substantially hemispherical shape. The sliding portion 617 includes the arm convex surface 617p, an arm concave surface 617q, and an arm end surface 617e. The arm convex surface 617p is the external surface of the sliding portion 617 and has a spherical surface shape. The arm concave surface 617q is the internal surface of the sliding portion 617 and has a spherical surface shape. The center of the arm concave surface 617q is the same as the center of the arm convex surface 617p. The arm end surface 617e is the end surface of the sliding portion 617 that connects the arm convex surface 617p and the arm concave surface 617q. Part of the arm end surface 617e is formed in a conical surface shape.

As illustrated in FIG. 11, the external bush 63 is an annular member located between the inner circumferential surface of the housing 60 and the arm 61. The external bush 63 is formed of metal. The metal used for the external bush 63 is brass, for example. The external bush 63 is press-fitted into the housing 60. The external bush 63 includes a bush concave surface 63q serving as its inner circumferential surface. The bush concave surface 63q has a spherical surface shape and is in contact with the arm convex surface 617p. The center and the radius of the bush concave surface 63q are the same as those of the arm convex surface 617p.

As illustrated in FIG. 11, the internal bush 65 is located inside the sliding portion 617 of the arm 61. The internal bush 65 is located on the opposite side of the external bush 63 with respect to the sliding portion 617. The internal bush 65 is formed of metal. The metal used for the internal bush 65 is brass, for example. The internal bush 65 includes a head portion 651 and a body portion 653. The head portion 651 has a substantially hemispherical shape and a bush convex surface 651p. The bush convex surface 651p is a spherical surface and in contact with the arm concave surface 617q. Accordingly, the sliding portion 617 is sandwiched between the bush convex surface 651p of the internal bush 65 and the bush concave surface 63q of the external bush 63. The center and the radius of the bush convex surface 651p are the same as those of the arm concave surface 617q. The body portion 653 is a substantially cylindrical member extending from the head portion 651 toward the opposite side of the bush convex surface 651p.

The supporting member 69 supports the internal bush 65. As illustrated in FIG. 11, the supporting member 69 is attached inside the housing 60. The supporting member 69 is formed of metal. The metal used for the supporting member 69 is steel, for example. The supporting member 69 includes a male screw 691, a first recess 693, and a second recess 695. The male screw 691 engages with a female screw 601 provided to the housing 60. The first recess 693 is a dent that opens toward the internal bush 65 and has a truncated cone shape. The bottom surface of the first recess 693 is a plane perpendicular to the extending direction of the body portion 653 of the internal bush 65. The second recess 695 is a dent that is provided on the bottom surface of the first recess 693 and has a columnar shape. The body portion 653 is fitted in the second recess 695 and guided by the inner circumferential surface of the second recess 695.

As illustrated in FIG. 11, the elastic members 67 are located between the internal bush 65 and the supporting member 69 and press the internal bush 65 toward the arm 61. The elastic member 67 is a disc spring, for example. Two elastic members 67 are arranged overlapping with each other between the body portion 653 and the bottom surface of the second recess 695.

The inside of the housing 60 is filled with lubricant. The lubricant is grease, for example. The sliding portion 617 of the arm 61 can move along the external bush 63 and the internal bush 65. Accordingly, the arm 61 can rotate and swing relatively with respect to the external bush 63 and the internal bush 65. As illustrated in FIG. 11, the arm end surface 617e is in contact with the bottom surface of the first recess 693. When the arm end surface 617e is in contact with the bottom surface of the first recess 693, a gap 60c is formed between the arm 61 and the housing 60.

The materials used for the respective first universal joint 6a and second universal joint 6b are not limited to those described above. The number of elastic members 67 included in the first universal joint 6a and the second universal joint 6b is not limited to any specific number. The number may be one or three or more. The first universal joint 6a and the second universal joint 6b do not necessarily have the same structure.

The first universal joint 6a and the second universal joint 6b are not necessarily used for the extension-retraction link 2. The extension-retraction link 2 is an example of objects to which the first universal joint 6a and the second universal joint 6b are applied. For example, the first universal joint 6a and the second universal joint 6b can be applied to a part other than the suspension 1 of the vehicle 10 and can also be applied to an apparatus other than the vehicle 10.

As illustrated in FIG. 3, the actuator 5 includes a motor 51, the screw shaft 57, a bearing unit 55, a nut 59, a snap ring 58, and a clutch 7.

As illustrated in FIG. 6, the motor 51 is disposed at the end portion of the stationary shaft 3 on the opposite side of the movable shaft 4. The motor 51 is fixed to the stationary shaft 3. The motor 51 includes an encoder that detects a rotation angle of a rotor. A shaft 511 that rotates together with the rotor of the motor 51 extends toward the inside of the stationary shaft 3.

The screw shaft 57 is connected to the shaft 511 with the clutch 7 interposed therebetween. The screw shaft 57 rotates together with the shaft 511 around the rotation axis Z serving as the rotation center. Part of the screw shaft 57 is inserted into the movable shaft 4. The end of the screw shaft 57 is located in the internal space 40 of the movable shaft 4. The screw shaft 57 passes through the nut 59.

The bearing unit 55 supports the screw shaft 57 such that the screw shaft 57 can rotate with respect to the stationary shaft 3. The bearing unit 55 is fixed to the stationary shaft 3 and has bearings 551 built-in. The bearings 551 are fitted in the outer circumferential surface of the screw shaft 57.

As illustrated in FIG. 6, the nut 59 is fixed to the movable shaft 4 with the snap ring 58 and moves together with the movable shaft 4. The nut 59 includes two protrusions 591 protruding in the radius direction. The protrusions 591 are fitted in a recess 49 provided on the end surface of the movable shaft 4. This restricts the rotation of the nut 59. The snap ring 58 is fitted in a substantially annular groove provided on the inner circumferential surface of the movable shaft 4 and positions the nut 59 in the axial direction.

Figure 13:
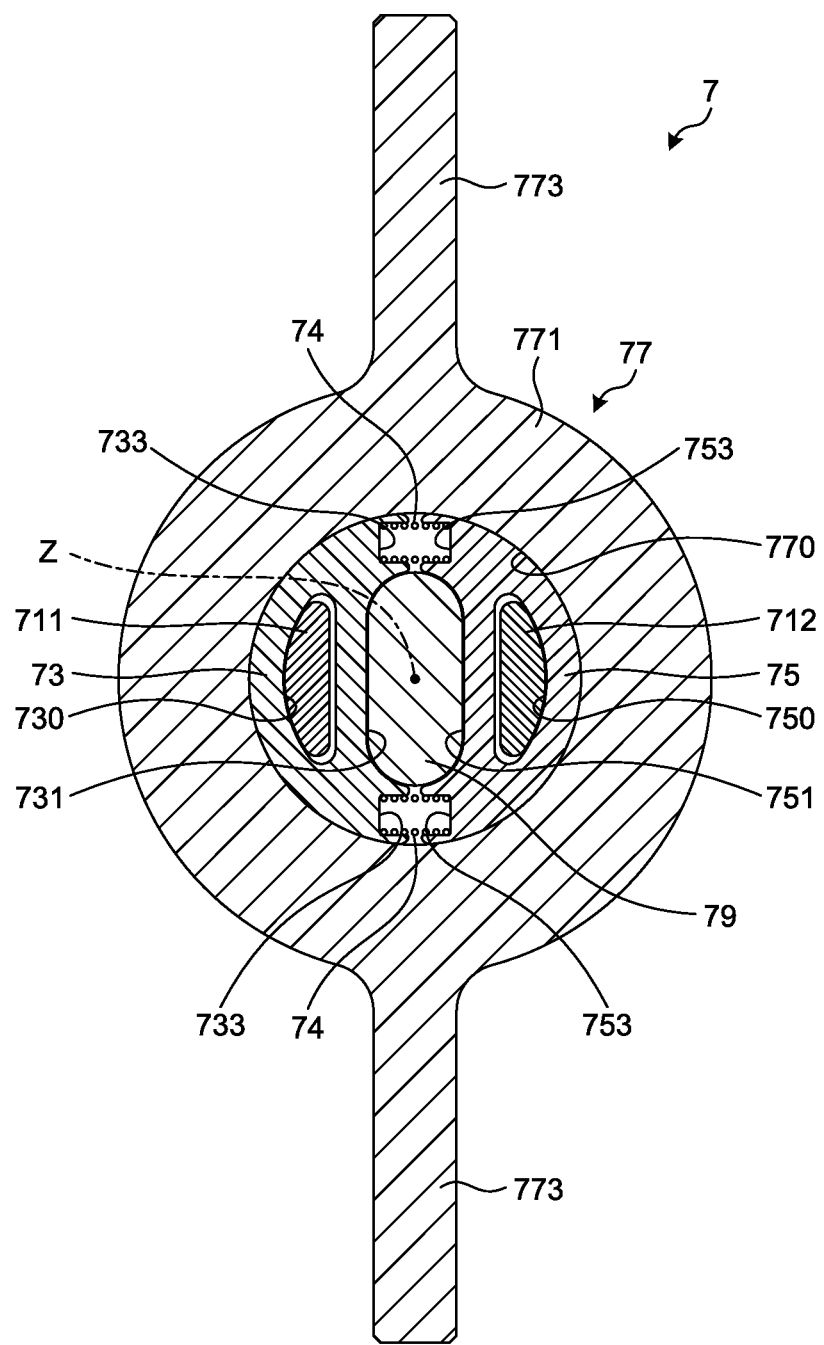
FIG. 13 is a cross-sectional view taken along D-D in FIG. 10.
Figure 14:
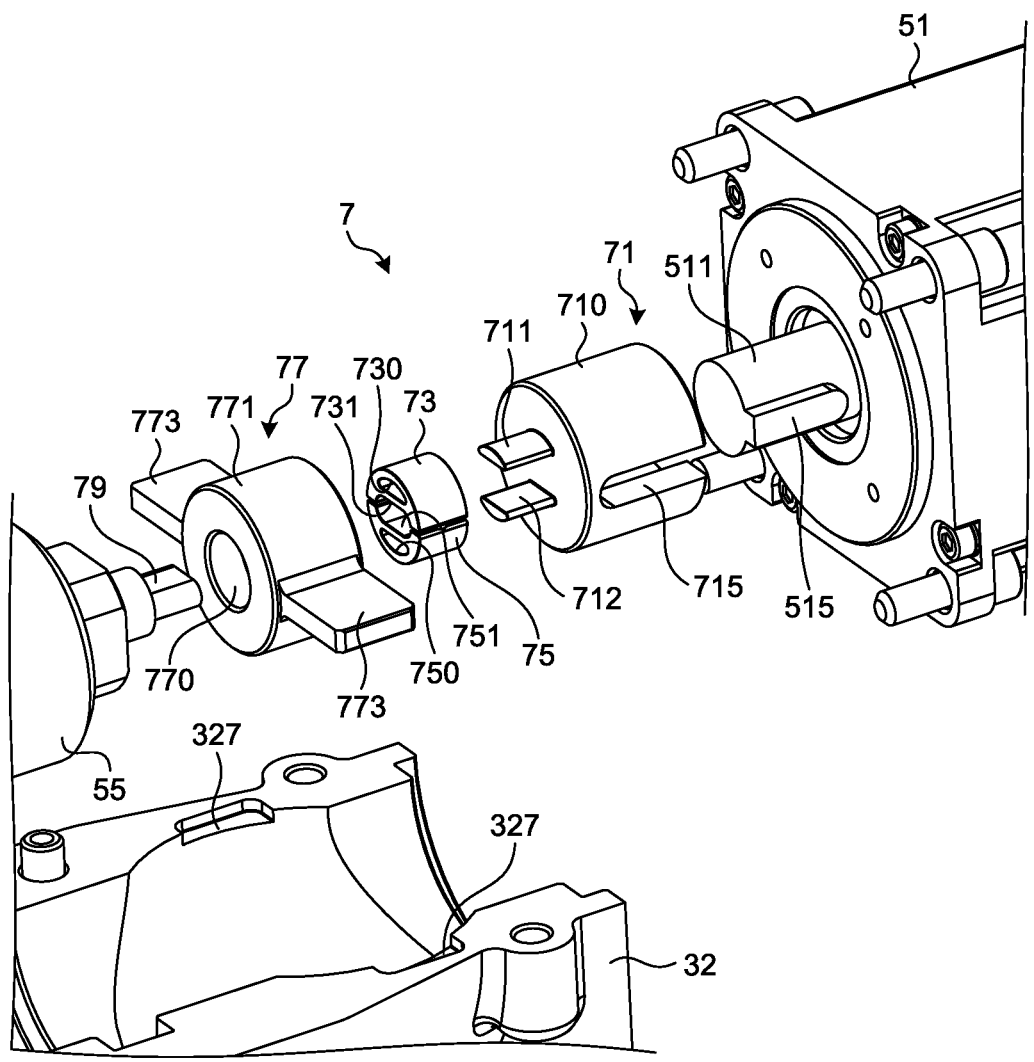
FIG. 14 is an exploded perspective view of a clutch in the embodiment.

FIG. 13 is a cross-sectional view taken along D-D in FIG. 10. FIG. 14 is an exploded perspective view of the clutch in the embodiment.

As illustrated in FIGS. 13 and 14, the clutch 7 includes an input side member 71, a first brake shoe 73, a second brake shoe 75, a brake drum 77, an engagement element 79, and elastic members 74.

As illustrated in FIG. 14, the input side member 71, which is a member having a substantially cylindrical shape, is attached to the shaft 511. The input side member 71 includes a key groove 715, a main body 710, a first pin 711, and a second pin 712. The main body 710 has a substantially cylindrical shape along the shaft 511, and includes the key groove 715. The shaft 511 includes a key 515 that is a protrusion extending in the axial direction. The key 515 fits in the key groove 715. Accordingly, the input side member 71 rotates together with the shaft 511. The first pin 711 and the second pin 712 protrude from the end surface of the main body 710 toward the screw shaft 57 side. The second pin 712 is disposed on the opposite side of the first pin 711 with respect to the rotation axis Z. As illustrated in FIG. 13, in the cross-section obtained by cutting the first pin 711 and the second pin 712 along a plane perpendicular to the rotation axis Z, the outside surface in the radius direction of the first pin 711 is a circular arc. The inside surface in the radius direction of the first pin 711 is a plane. In the cross-sectional surface in FIG. 13, the outer shape of the second pin 712 and the outer shape of the first pin 711 are point-symmetric about the rotation axis Z.

As illustrated in FIG. 13, the first brake shoe 73 is a substantially semicircular columnar member. The first brake shoe 73 includes a first fitting portion 730, a first engagement groove 731, and two first elastic member grooves 733. The first fitting portion 730 is a hole penetrating in the axial direction. The first fitting portion 730 is also described as a first hole. The first pin 711 fits in the first fitting portion 730. The first engagement groove 731 and the first elastic member grooves 733 are grooves provided on the surface on the second brake shoe 75 side. The first engagement groove 731 is disposed between the two first elastic member grooves 733. The first engagement groove 731 has a length corresponding to the entire length of the first brake shoe 73 in the axial direction. The first elastic member grooves 733 are arranged at the center of the first brake shoe 73 in the axial direction. The first fitting portion 730 is not necessarily a hole, and may be a recess, for example.

As illustrated in FIG. 13, the second brake shoe 75 is a substantially semicircular columnar member. The second brake shoe 75 includes a second fitting portion 750, a second engagement groove 751, and two second elastic member grooves 753. The second fitting portion 750 is a hole penetrating in the axial direction. The second fitting portion 750 is also described as a second hole. The second pin 712 fits in the second fitting portion 750. The second engagement groove 751 and the second elastic member grooves 753 are the grooves provided on the surface on the first brake shoe 73 side. The second engagement groove 751 is disposed between the two second elastic member grooves 753. The second engagement groove 751 has a length corresponding to the entire length of the second brake shoe 75 in the axial direction. The second elastic member grooves 753 are arranged at the center of the second brake shoe 75 in the axial direction. The second fitting portion 750 is not necessarily a hole, and may be a recess, for example.

As illustrated in FIG. 13, a gap having an oval shape when viewed from the axial direction is formed by the first engagement groove 731 and the second engagement groove 751. A columnar gap is formed by each of the first elastic member groove 733 and the second elastic member groove 753.

The brake drum 77 is a member that puts a brake on the first brake shoe 73 and the second brake shoe 75. As illustrated in FIG. 13, the brake drum 77 includes a base 771 and two arms 773. The base 771 has a cylindrical shape having a hole 770. The first brake shoe 73 and the second brake shoe 75 are inserted into the hole 770. The inner circumferential surface of the base 771 faces the outer circumferential surface of the first brake shoe 73 and the outer circumferential surface of the second brake shoe 75. The arm 773 is a plate-like member protruding from the outer circumferential surface of the base 771. The two arms 773 extend in mutually opposite directions. The arms 773 fit in recesses 327 provided to the second member 32 illustrated in FIG. 14. The arms 773 are sandwiched by the first member 31 and the second member 32, resulting in the brake drum 77 being fixed to the stationary shaft 3. This prevents the brake drum 77 from rotating.

The engagement element 79, which is attached to the screw shaft 57, rotates together with the screw shaft 57. As illustrated in FIG. 13, the engagement element 79 viewed from the axial direction has an oval shape. The engagement element 79 fits in a gap formed by the first engagement groove 731 and the second engagement groove 751.

The elastic member 74 is a helical compression spring, for example. The elastic member 74 is disposed in a gap formed by the first elastic member groove 733 and the second elastic member groove 753. The elastic members 74 apply force to the first brake shoe 73 and the second brake shoe 75 in such a direction that the first brake shoe 73 and the second brake shoe 75 separate from each other.

When the motor 51 operates, the input side member 71 rotates together with the shaft 511. The rotation of the first pin 711 and the second pin 712 of the input side member 71 applies force to the first brake shoe 73 and the second brake shoe 75 in such a direction that the first brake shoe 73 and the second brake shoe 75 approach each other. Accordingly, the engagement element 79 is held by the first brake shoe 73 and the second brake shoe 75. The integral rotation of the first brake shoe 73, the second brake shoe 75, and the engagement element 79 causes the rotation of the shaft 511 to be transmitted to the screw shaft 57.

When the motor 51 stops, external force is applied to the movable shaft 4 in some cases. When external force in the axial direction is applied to the movable shaft 4, the screw shaft 57 rotates. When the engagement element 79 rotates together with the screw shaft 57, force is applied in such a direction that the first brake shoe 73 and the second brake shoe 75 separate from each other. Accordingly, the first brake shoe 73 and the second brake shoe 75 are pressed to the brake drum 77. Frictional force restricts the rotation of the first brake shoe 73 and the second brake shoe 75. This prevents the engagement element 79 and the screw shaft 57 from rotating. In this way, even when external force is applied to the movable shaft 4 at the time of stoppage of the motor 51, the movement of the movable shaft 4 is restricted. That is, generating reaction force for maintaining the position of the movable shaft 4 requires no supply of electrical power to the motor 51. The external force applied to the movable shaft 4 at the time of stoppage of the motor 51 is, for example, external force transmitted to the movable shaft 4 in a case where the wheel 102 touches a curbstone or the like when the vehicle 10 is being parked. External force received by the wheel 102 from the curb or the like is transmitted to the movable shaft 4, thereby causing the screw shaft 57 to rotate.

The clutch 7 does not necessarily include the elastic members 74. In such a case, the first elastic member grooves 733 and the second elastic member grooves 753 may be omitted. The engagement element 79 viewed from the axial direction does not necessarily have an oval shape, and is only required to have a shape other than a circular shape. A distance from the rotation axis Z to the outer circumferential surface of the engagement element 79 is only required to be not constant.

The controller 9 illustrated in FIG. 1 is a computer, which includes, for example, a central processing unit (CPU), a read only memory (ROM), a random access memory (RAM), an input interface, and an output interface. The controller 9 is an electronic control unit (ECU) mounted on the vehicle 10, for example. The controller 9 is electrically connected to the motors 51 of the respective extension-retraction links 2. The controller 9 controls the motors 51 individually. As a result, the length of each extension-retraction link 2 (position of the movable shaft 4) changes.

The suspension 1 in the embodiment includes five extension-retraction links 2 for each wheel 102. The suspension 1 can change a toe angle, a camber angle, a caster angle, a tread width, and a wheelbase by changing the length of each extension-retraction link 2. The toe angle is, when the vehicle 10 is viewed from the vertical direction, an angle made by a straight line perpendicular to the rotation axis of the wheel 102 with respect to the straight line parallel with the front-rear direction of the vehicle. The camber angle is, when the vehicle 10 is viewed from the front-rear direction, an angle made by the straight line perpendicular to the rotation axis of the wheel 102 with respect to the vertical line. The caster angle is, when the vehicle 10 is viewed from the horizontal direction, an angle made by a straight line parallel with the longitudinal direction of the shock absorber 11 with respect to the vertical line. The tread width is a distance between the centers of the left and right wheels 102. The wheelbase is a distance between the centers of the front and rear wheels 102.

The suspension 1 is not necessarily applied to vehicles with the hub units 101 having motors and the like built-in. The suspension 1 may be connected to the hub carrier including a hub bearing supporting the wheel 102.

The suspension 1 does not necessarily include five extension-retraction links 2. The suspension 1 is only required to include a plurality of links, at least one of which should be the extension-retraction link 2.

As described above, the suspension 1 includes a plurality of links that connect the vehicle body side member 18 and the hub carrier 19. At least one of the links is the extension-retraction link 2. The extension-retraction link 2 includes: the stationary shaft 3; the first universal joint 6a that connects the stationary shaft 3 to the vehicle body side member 18 such that the stationary shaft 3 can rotate and swing with respect to the vehicle body side member 18; the movable shaft 4 that can slide with respect to the stationary shaft 3; the second universal joint 6b that connects the movable shaft 4 to the hub carrier 19 such that the movable shaft 4 can rotate and swing with respect to the hub carrier 19; and the actuator 5 that is fixed to the stationary shaft 3 and moves the movable shaft 4.

Accordingly, the suspension 1 can change the posture of the wheel 102 by moving the movable shaft 4. The suspension 1 can easily change the relative posture of the wheel 102 with respect to the vehicle body.

The suspension 1 includes five extension-retraction links 2.

Accordingly, the suspension 1 can change the toe angle, the camber angle, the caster angle, the tread width, and the wheelbase by moving the movable shaft 4. The suspension 1 can easily change the relative posture of the wheel 102 with respect to the vehicle body.

The extension-retraction link 2 includes: the tubular stationary shaft 3; the first universal joint 6a that connects the stationary shaft 3 to the vehicle body side member 18 such that the stationary shaft 3 can rotate and swing with respect to the vehicle body side member 18; the movable shaft 4, part of which is located inside the stationary shaft 3 and that can slide with respect to the stationary shaft 3; the second universal joint 6b that connects the movable shaft 4 to the hub carrier 19 such that the movable shaft 4 can rotate and swing with respect to the hub carrier 19; and the actuator 5.

The actuator 5 includes: the motor 51 attached to the stationary shaft 3; the screw shaft 57 rotated by the motor 51; and the nut 59 that engages with the screw shaft 57 and is fixed to the movable shaft 4. The movable shaft 4 includes: the first plane surface 41; the second plane surface 42 making an angle with respect to the first plane surface 41; the third plane surface 43 located on the opposite side of the first plane surface 41; and the fourth plane surface 44 located on the opposite side of the second plane surface 42. The stationary shaft 3 includes: the first bush 351 in contact with the first plane surface 41; the second bush 352 in contact with the second plane surface 42; the third bush 353 in contact with the third plane surface 43; the fourth bush 354 in contact with the fourth plane surface 44; the first elastic member 363 pressing the third bush 353 to the third plane surface 43; and the second elastic member 364 pressing the fourth bush 354 to the fourth plane surface 44.

Accordingly, the movement of the movable shaft 4 connected to the hub carrier 19 enables the posture of the wheel 102 to change. The extension-retraction link 2 can easily change the relative posture of the wheel 102 with respect to the vehicle body.

Further, the first elastic member 363 and the second elastic member 364 can maintain a state where the first bush 351, the second bush 352, the third bush 353, and the fourth bush 354 are in contact with the movable shaft 4. This prevents backlash of the movable shaft 4 without requiring high machining accuracy. The extension-retraction link 2 can make the movement of the movable shaft 4 smooth.

In the extension-retraction link 2, the connected portion (fastening portion 611) of the first universal joint 6a with the vehicle body side member 18, and the connected portion (fastening portion 611) of the second universal joint 6b with the hub carrier 19 are located on the same side with respect to the plane (e.g., the plane PZ illustrated in FIG. 8) including the rotation axis Z of the screw shaft 57, and on the opposite side of the third bush 353 and the fourth bush 354.

The positional relation among the stationary shaft 3, the first universal joint 6a, the movable shaft 4, and the second universal joint 6b causes force toward the first bush 351 and the second bush 352 to act on the movable shaft 4 with the movement of the movable shaft 4. Even in such a case, the first elastic member 363 and the second elastic member 364 make it harder for a gap to be formed in the gap between the third bush 353 and the third plane surface 43 and the gap between the fourth bush 354 and the fourth plane surface 44. Accordingly, the extension-retraction link 2 can prevent backlash of the movable shaft 4 even when force in the radius direction is applied to the movable shaft 4.

In the extension-retraction link 2, the angle $\alpha$ made between the first plane surface 41 and the second plane surface 42 and the angle $\beta$ made between the third plane surface 43 and the fourth plane surface 44 are acute angles.

For example, the movable shaft 4 may be deformed by a wheel load and the like received by the wheel 102 while the vehicle 10 is moving (especially while turning). In particular, the movable shaft 4 may be deformed around an axis that is in parallel with the plane PZ illustrated in FIG. 8 and perpendicular to the rotation axis Z (around the axis in parallel with the upper and lower direction in FIG. 8). A section modulus of the movable shaft 4 about the axis when the angles $\alpha$ and $\beta$ are acute angles is larger than that when the angles $\alpha$ and $\beta$ are obtuse angles. Accordingly, stiffness of the movable shaft 4 with respect to a moment applied to the movable shaft 4 increases. This prevents deformation of the movable shaft 4, thereby making the movement of the movable shaft 4 smoother.

In the extension-retraction link 2, each of the first bush 351, the second bush 352, the third bush 353, and the fourth bush 354 includes multiple lubricant grooves 35*d* filled with lubricant.

This makes it harder for lubricant surrounding the movable shaft 4 to be exhausted, thereby making the movement of the movable shaft 4 smoother. The angles α and β are acute angles, thereby preventing deformation of the movable shaft 4. As a result, lubricant surrounding the movable shaft 4 is applied on the movable shaft 4.

The suspension 1 including the extension-retraction link 2 can make the movement of the wheel 102 smooth by the movable shaft 4, the backlash of which is prevented.

The universal joint (the first universal joint 6*a* or the second universal joint 6*b*) includes: the housing 60; the arm 61, part of which is located inside the housing 60; the external bush 63 located between the inner circumferential surface of the housing 60 and the arm 61; the internal bush 65 located on the opposite side of the external bush 63 with the arm 61 interposed therebetween; and the supporting member 69 supporting the internal bush 65. The arm 61 includes: the arm convex surface 617*p* that is a spherical convex surface; and the arm concave surface 617*q* that is a spherical concave surface. The external bush 63 includes the bush concave surface 63*q* that is a spherical concave surface in contact with the arm convex surface 617*p*. The internal bush 65 includes the bush convex surface 651*p* that is a spherical convex surface in contact with the arm concave surface 617*q*.

With use of a conventionally available ball joint having a ball and a socket, the increase of a movable range and a permissible load requires the increase of the diameter of the ball. On the other hand, with the universal joint (the first universal joint 6*a* or the second universal joint 6*b*) in the embodiment, the arm 61 is sandwiched and held by the bush concave surface 63*q* of the external bush 63 and the bush convex surface 651*p* of the internal bush 65. Accordingly, a contact area between the arm 61 and the external bush 63 and a contact area between the arm 61 and the internal bush 65 can be easily maintained constant, thereby increasing the permissible load of the universal joint. Consequently, the universal joint is smaller than the ball joint even when the movable range and the permissible load are increased. Therefore, the universal joint can easily increase the movable range and achieve a compact size.

The universal joint (the first universal joint 6*a* or the second universal joint 6*b*) includes the elastic members 67 that push the internal bush 65 toward the arm 61.

This makes it harder for a gap to be formed between the arm 61 and the internal bush 65 and between the arm 61 and the external bush 63. This prevents backlash of the universal joint (the first universal joint 6*a* or the second universal joint 6*b*). As a result, the posture of the wheel 102 is stabilized, thereby increasing running stability of the vehicle 10.

In the universal joint (the first universal joint 6*a* or the second universal joint 6*b*), the arm 61 includes the arm end surface 617*e* located between the arm convex surface 617*p* and the arm concave surface 617*q*. When the arm end surface 617*e* is in contact with the supporting member 69, the gap 60*c* is present between the arm 61 and the housing 60.

This reduces bending stress applied to the arm 61 when the arm 61 is tilted at a maximum with respect to the housing 60. As a result, the arm 61 is prevented from being broken.

In the universal joint (the first universal joint 6*a* or the second universal joint 6*b*), the housing 60 includes the female screw 601. The supporting member 69 includes the male screw 691 engaging with the female screw 601. That is, the supporting member 69 is fixed to the housing 60 by the engagement of the male screw 691 with the female screw 601.

This makes it possible to fix the supporting member 69 to the housing 60 at a lower cost than a case where the supporting member 69 is fixed to the housing 60 by swaging the housing 60 or a case where the supporting member 69 is fixed to the housing 60 by welding. Further, the size of the gap 60*c* between the arm 61 and the housing 60 can be adjusted. Consequently, the universal joint (the first universal joint 6*a* or the second universal joint 6*b*) can prevent the interference of the arm 61 with the housing 60.

In the extension-retraction link 2, at least one of the first universal joint 6*a* and the second universal joint 6*b* is the universal joint described above.

This allows the first universal joint 6*a* or the second universal joint 6*b* to have a wide movable range, thereby allowing the extension-retraction link 2 to easily change the relative posture of the wheel 102 with respect to the vehicle body.

The universal joint (the first universal joint 6*a* or the second universal joint 6*b*) has a compact size, thereby allowing the suspension 1 to have a plurality of universal joints arranged close to one another. Accordingly, the suspension 1 can include the multiple extension-retraction links 2, thereby allowing the wheel 102 to easily change its relative posture with respect to the vehicle body.

In the extension-retraction link 2, the actuator 5 includes: the motor 51 attached to the stationary shaft 3; the screw shaft 57 rotated by the motor 51; the clutch 7 disposed between the motor 51 and the screw shaft 57; and the nut 59 that engages with the screw shaft 57 and is fixed to the movable shaft 4. The clutch 7 includes the input side member 71, the first brake shoe 73, the second brake shoe 75, the brake drum 77, and the engagement element 79. The input side member 71 rotates together with the shaft 511 of the motor 51 and has the first pin 711 and the second pin 712. The first brake shoe 73 has the first fitting portion 730, in which the first pin 711 fits. The second brake shoe 75 has the second fitting portion 750, in which the second pin 712 fits, and is located on the opposite side of the first brake shoe 73 with respect to the rotation axis Z of the screw shaft 57. The brake drum 77 has the inner circumferential surface facing the outer circumferential surfaces of the first brake shoe 73 and the second brake shoe 75 and is fixed to the stationary shaft 3. The engagement element 79 rotates together with the screw shaft 57 and fits in the gap between the first brake shoe 73 and the second brake shoe 75.

Accordingly, the extension-retraction link 2 can change the posture of the wheel 102 by moving the movable shaft 4. The extension-retraction link 2 can easily change the relative posture of the wheel 102 with respect to the vehicle body. Further, when the screw shaft 57 is rotated by external force applied to the movable shaft 4, force is applied by the engagement element 79 in such a direction that the first brake shoe 73 and the second brake shoe 75 separate from each other. This causes the first brake shoe 73 and the second brake shoe 75 to be pressed to the brake drum 77, thereby preventing the rotation of the engagement element 79 and the screw shaft 57. In this way, even when external force is applied to the movable shaft 4 at the time of stoppage of the motor 51, the movement of the movable shaft 4 is restricted. The extension-retraction link 2 can easily maintain the relative posture of the wheel 102 with respect to the vehicle body. When the position of the movable shaft 4 is maintained, no electric power supply to the motor 51 is required. Accordingly, the extension-retraction link 2 can reduce power consumption.

The extension-retraction link 2 includes the elastic members 74 that apply force in such a direction that the first brake shoe 73 and the second brake shoe 75 separate from each other.

Accordingly, even when the engagement element 79 does not push the first brake shoe 73 and the second brake shoe 75, the elastic members 74 press the first brake shoe 73 and the second brake shoe 75 to the brake drum 77. Consequently, the extension-retraction link 2 can prevent backlash of the first brake shoe 73 due to the gap between the engagement element 79 and the first brake shoe 73, and backlash of the second brake shoe 75 due to the gap between the engagement element 79 and the second brake shoe 75.

The suspension 1 including the actuator 5 has the clutch 7, thereby reducing the power consumption of the vehicle.

REFERENCE SIGNS LIST 1 suspension
10 vehicle
101 hub unit
102 wheel
11 shock absorber
18 vehicle body side member
19 hub carrier
2 extension-retraction link
3 stationary shaft
31 first member
311 first facing surface
311d recess
312 second facing surface
312d recess
315 groove
32 second member
323 third facing surface
323d recess
324 fourth facing surface
324d recess
351 first bush
352 second bush
353 third bush
354 fourth bush
363 first elastic member
364 second elastic member
4 movable shaft
40 internal space
41 first plane surface
42 second plane surface
43 third plane surface
44 fourth plane surface
45 stopper
5 actuator
51 motor
511 shaft
515 key
55 bearing unit
57 screw shaft
58 snap ring
59 nut
6a first universal joint
6b second universal joint
60 housing
60c gap
61 arm
611 fastening portion
613 flange portion
615 intermediate portion
617 sliding portion
617e arm end surface
617p arm convex surface
617q arm concave surface
63 external bush
63q bush concave surface
65 internal bush
651 head portion
651p bush convex surface
653 body portion
67 elastic member
69 supporting member
691 male screw
693 first recess
695 second recess
7 clutch
71 input side member
710 main body
711 first pin
712 second pin
715 key groove
73 first brake shoe
730 first fitting portion
731 first engagement groove
733 first elastic member groove
74 elastic member
75 second brake shoe
750 second fitting portion
751 second engagement groove
753 second elastic member groove
77 brake drum
79 engagement element
9 controller
Z rotation axis

The invention claimed is:

1. An extension-retraction link, comprising:
a stationary shaft having a tubular shape;
a first universal joint that connects the stationary shaft to a vehicle body side member such that the stationary shaft is capable of rotating and swinging with respect to the vehicle body side member;
a movable shaft, part of which is located inside the stationary shaft, and that is capable of sliding with respect to the stationary shaft;
a second universal joint that connects the movable shaft to a hub carrier such that the movable shaft is capable of rotating and swinging with respect to the hub carrier; and
an actuator that includes: a motor attached to the stationary shaft; a screw shaft rotated by the motor; and a nut that engages with the screw shaft and is fixed to the movable shaft, wherein
the movable shaft includes: a first plane surface; a second plane surface making an angle with respect to the first plane surface; a third plane surface located on an opposite side of the first plane surface; and a fourth plane surface located on an opposite side of the second plane surface, and
the stationary shaft includes: a first bush in contact with the first plane surface; a second bush in contact with the second plane surface; a third bush in contact with the third plane surface; a fourth bush in contact with the fourth plane surface; a first elastic member pressing the third bush to the third plane surface; and a second elastic member pressing the fourth bush to the fourth plane surface.

2. The extension-retraction link according to claim 1, wherein each of the first bush, the second bush, the third bush, and the fourth bush includes a plurality of lubricant grooves, in which lubricant is filled.

3. A suspension, comprising the extension-retraction link according to claim 1.

4. The extension-retraction link according to claim 1, wherein a connected portion of the first universal joint and the vehicle body side member and a connected portion of the second universal joint and the hub carrier are located on an identical side with respect to a plane including a rotation axis of the screw shaft, and are located on an opposite side of the third bush and the fourth bush.

5. The extension-retraction link according to claim 4, wherein the angle made between the first plane surface and the second plane surface and an angle made between the third plane surface and the fourth plane surface are acute angles.

* * * * *